United States Patent [19]

Hasebe et al.

[11] Patent Number: 4,470,119
[45] Date of Patent: Sep. 4, 1984

[54] MOBILE NAVIGATOR

[75] Inventors: Koshi Hasebe, Anjo; Shinzo Totani, Nagoya; Kazuo Muramoto, Ichinomiya; Hajime Mikuni, Kariya; Kazushi Akutsu, Kariya; Kazuaki Minami, Kariya, all of Japan

[73] Assignee: Nippondenso Co., Ltd., Kariya, Japan

[21] Appl. No.: 395,339

[22] Filed: Jul. 6, 1982

[30] Foreign Application Priority Data

Jul. 7, 1981 [JP] Japan .................. 56-106572
Dec. 10, 1981 [JP] Japan .................. 56-199898

[51] Int. Cl.³ .................. G06F 15/50; G09B 29/10
[52] U.S. Cl. .................. 364/449; 364/424; 364/454; 364/521; 364/571; 353/12; 343/451; 343/452; 340/990; 340/995; 73/178 R
[58] Field of Search ............. 364/443, 444, 447, 454, 364/457, 449, 521, 571, 424; 353/11, 12; 340/988–990, 992, 995, 996; 343/450–453; 327/207, 208; 73/178 R

[56] References Cited

U.S. PATENT DOCUMENTS

| 4,079,322 | 3/1978 | Lawrence et al. | 340/989 |
| 4,086,632 | 4/1978 | Lions | 364/444 |
| 4,139,889 | 2/1979 | Ingels | 364/424 |
| 4,312,577 | 1/1982 | Fitzgerald | 353/12 |
| 4,316,253 | 2/1982 | Possémé | 364/449 |
| 4,367,453 | 1/1983 | Kuno et al. | 340/988 |

FOREIGN PATENT DOCUMENTS 55-159299 12/1980 Japan .

Primary Examiner—Gary Chin
Attorney, Agent, or Firm—Cushman, Darby & Cushman

[57] ABSTRACT

A mobile navigator comprises a distance detector for generating a running distance signal, an azimuth detector for generating a progression azimuth detecting signal, a CRT display for indicating the current position of an automotive vehicle, a microcomputer for calculating the current position of the vehicle from the distance detecting signal and the progression azimuth detecting signal and supplying the current position signal to the display, and a memory in which is stored a plurality of map data, earth's magnetic field declination information different for each area in association with the map data, and earth's magnetic field strength information.

3 Claims, 12 Drawing Figures

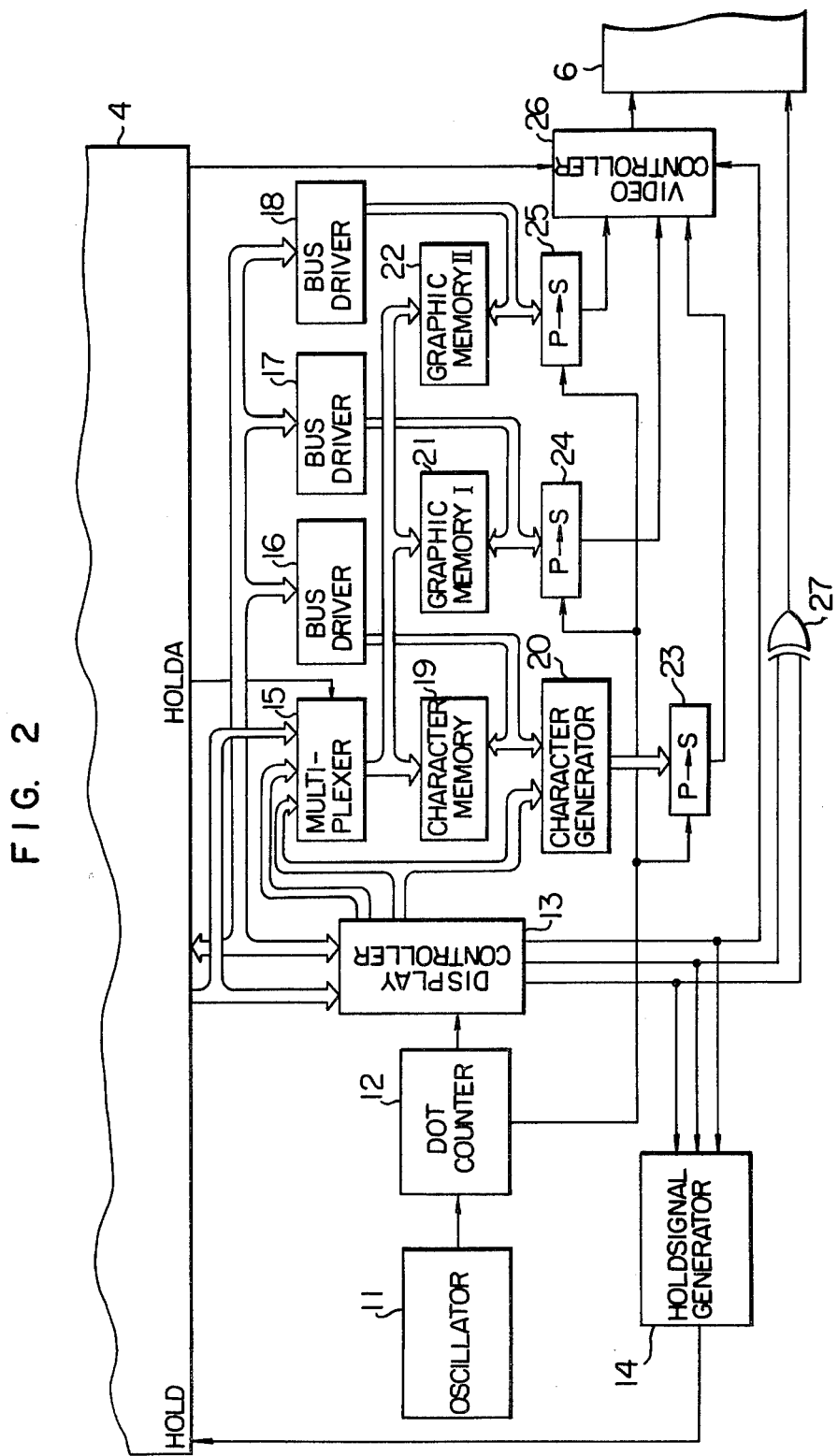
F I G. 2

MOBILE NAVIGATOR

This invention relates to a mobile navigator for displaying the current position of a vehicle on a road map.

A navigator of this kind is published in Japanese Laid-open Patent Publication No. 55-159299, in which the navigator comprises a distance sensor for detecting the distance the vehicle has run, and an azimuth sensor for detecting the azimuth in which the vehicle progresses, to thereby display the current position of the vehicle on a road map on a display.

In this navigator, however, a signal from the azimuth sensor is deviated a different declination for each area (for example, in a certain area of Aichiken, Japan the declination is 6.5°, and in some area of Hokkaido, Japan it is 9°), and therefore the current position of vehicle on a road map will be deviated by the corresponding amount. In addition, the signal from the azimuth sensor is difficult to be distingushed from an external disturbance at a fixed-gain amplifier because of different earth's magnetic field strength (horizontal component) for each area (for example, in Aichiken, Japan the field strength is 310 m gauss, in Hokkaido, Japan it is 260 m gauss, and in a certain area of the middle west district of USA it is 150 m gauss).

Accordingly, it is an object of this invention to provide a mobile navigator in which a plurality of map data and earth's information different for each area in association with the plurality of map data are stored in storage means, a particular map data is read from this storage means and displayed on display means as a road map of a particular area, earth's magnetic field information associated with the particular-area road map read from the storage means, the current position of a running vehicle is calculated from the earth's magnetic field, a progression azimuth detected by an azimuth detecting means, a running distance detected by a distance detecting means, and the calculated current position is displayed on the display means to be superimposed upon the road map displayed on the display means, so that the current position of the vehicle can be correctly displayed on a road map by taking the earth's magnetic field information for each area into consideration.

The invention will become more readily understood from the following examplary description taken with the accompanying drawing, in which:

FIG. 2 is a detailed connection diagram of the CRT controller in FIG. 1;

Figure 1:
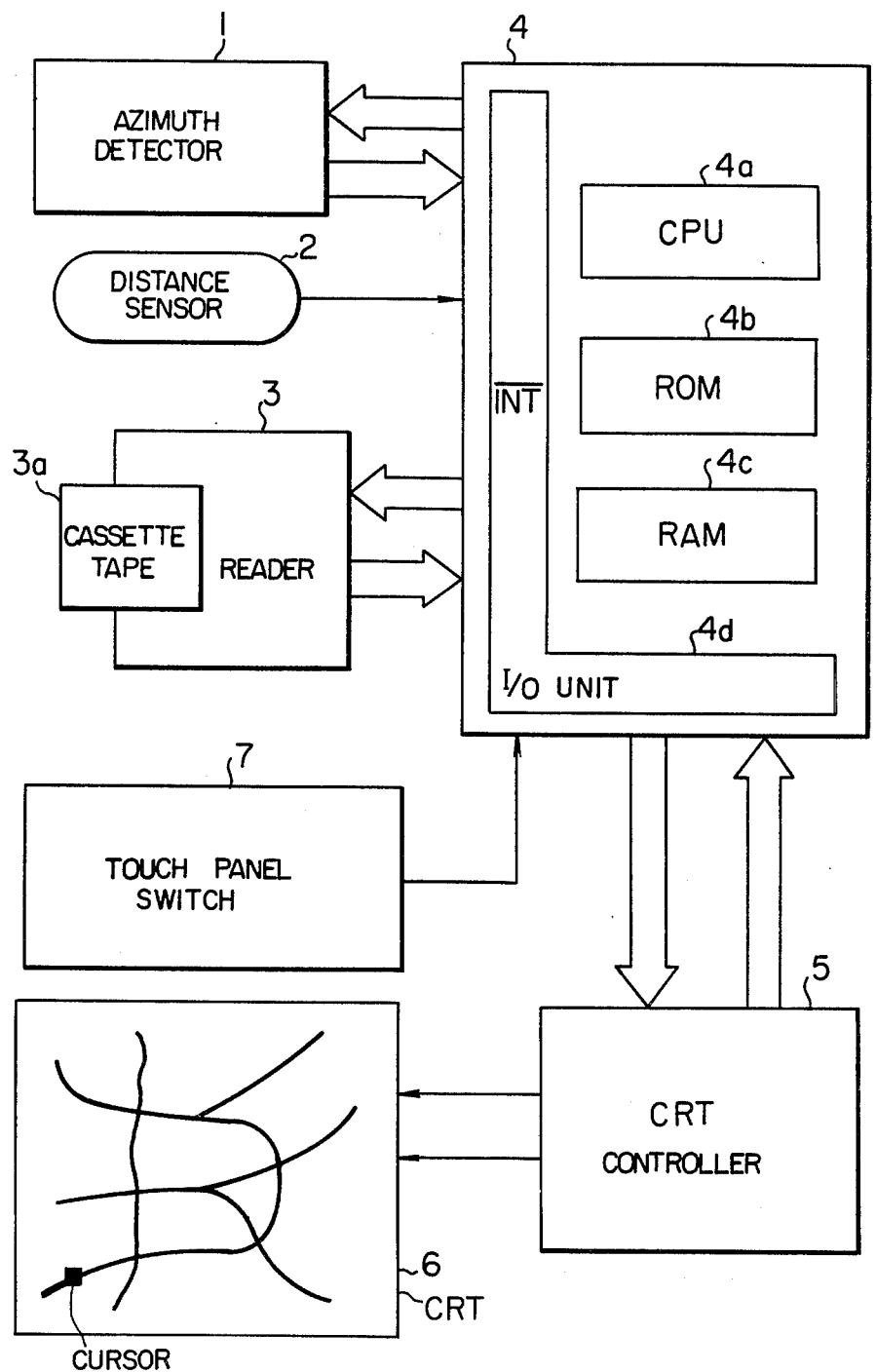
FIG. 1 shows the arrangement of one embodiment of this inventon.

An embodiment of this invention will hereinafter be described with reference to the drawings. FIG. 1 shows the whole arrangement of one embodiment of this invention. Referring to FIG. 1, there is shown a direction detector 1 which as a direction sensor for detecting the X- and Y-component of the earth's magnetic field in accordance with the direction in which a vehicle progresses, and an A/D converter for converting an analog signal from the sensor to a digital signal. Thus, this direction detector 1 genrates a digital signal of X- and Y-component according to the progression direction of vehicle. Shown at 2 is a distance sensor, which generates a distance pulse each time the vehicle progresses a unit distance (for example, about 39.2 cm). Shown at 3 is a reader for searching and reading map data in a specific region by setting a cassette tape 3a which stores thereon map data of a plurality of regions (including the absolute coordinate data at the upper right point of each map).

Shown at 4 is a microcomputer for executing the digital arithmetic processing in accordance with a certain control program. This microcomputer 4 comprises a CPU 4a, ROM 4b, RAM 4c and an I/O circuit section 4d. The microcomputer, upon operation, receives a digital signal of X- and Y-component from the direction detector 1, a distance pulse from the distance sensor 2, a read signal from the reader 3 and so on, executes the arithmetic processing of the signals and then generates a display signal for displaying a map in a particular region, running path information and so on. The RAM 4c is always backed up by the mobile battery independently of on-off operation of a key switch.

Shown at 5 is a cathode-ray tube (hereinafter called CRT) controller which is responsive to a display signal from the microcomputer 4 to store individually map data in a specific region, scanning path information and caracter data, and generates a video signal and a synchronizing signal for displaying on the CRT the stored map data, running path information or character data. Shown at 6 is a CRT dispaly, on which a map in a specific region, running path or character is displayed, and 7 is a touch panel switch which is mounted on the display screen of the CRT display 6. When a specific touch area of the 12 touch areas on the touch panel is touched, a serial signal corresponding to the area is generated.

The CRT controller 5 will be described in detail with reference to an electrical connection diagram of FIG. 2. There are shown an oscillation circuit 11 for genrating an oscillation signal of 12.096 MHz, a dot counter 12 for dividing the oscillation signal from the oscillation circuit 11 and generating a dot timing clock of 6.048 MHz and a character timing clock of 756 kHz, a display controller 13 reponsive to a command from the microcomputer 4 and the character timing clock from the dot counter 12 to generate horizontal and vertical synchronizing signals, a display timing signal, a refresh memory address signal, and a raster address signal, and a hold signal generating circuit 14 responsive to the horizontal and vertical synchronizing signals from the display controller 13 to generate a hold signal for holding the microcomputer 4 during displaying period, and supplying to a hold (HOLD) terminal of the microcomputer 4. Shown at 15 is a multiplexer for switching the address signal from the microcomputer 4, and the refresh memory address signal and raster address signal from the display controller 13 in response to a hold achknowledge (HOLDA) signal from the microcomputer 4. Shown at 16, 17 and 18 are bus drivers each having a tristate for switching data direction between the microcomputer 4 and display memory, 19 is a character memory for storing display data such as ASCII codes from the microcomputer 4 and producing the contents of a refresh memory address received from the display controller 13, as an address, and 20 is a character generator for producing a display pattern in response to the display address from the character memory 19 and the raster address signal from the display controller 13. In addition, shown at 21 is a first graphic memory for storing map data from the microcomputer 4, 22 is a second graphic memory for storing the running path information (running track data, current position data) from the microcomputer 4, 23, 24 and 25 are parallel to serial (P→S) converters for converting parallel signals from the character generator 20, and first and second graphic memories 21 and 22, to serial data in response to the dot timing clock, 26 is a video controller for selectively receiving signals from the (P→S) converters 23, 24 and 25 in order to switch the graphic and character pictures by the picture switching signal from the microcomputer, thereby producing a video signal in response to a display timing signal from the display controller 13, and 27 is an exclusive OR circuit which is supplied with the horizontal and vertical synchronizing signals from the display controller 13 so as to produce a synchronizing signal. The character memory 19, and the first and second graphic memories 21 and 22 are always backed up by the movile battery.

In other words, in this CRT controller 5, the character data is always stored in the character memory 19, the map data in the first graphic memory 21 and the running track and current position display data in the second graphic memory 22, in response to the data transmitted from the microcomputer 4. Also, in response to the picture switching signal from the microcomputer 4, selection is made between the graphic picture (displaying a running path and current position on a map) and the character on a map) and the character picture (displaying specific characters and so on for specifying a region). A video signal and synchronizing signal for displaying the picture associated the selection on the CRT supplied to the CRT display 6.

Figure 3:
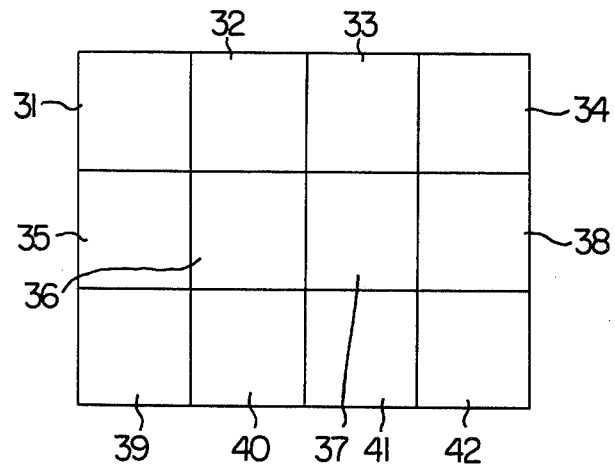
FIG. 3 is an explanatory diagram useful for explaining the touch area on the touch panel section.

The touch panel switch 7 has 12 touch areas 31 to 42 as shown in FIG. 3. This touch panel switch 7 is formed of two glass sheets on each of which a transparent conductive film is formed in a matrix array. When a particular touch area is pushed, the glass sheets at the corresponding area are deformed to cause the transparent film areas to touch each other, thereby the touch area being detected. A touch signal generating circuit, although not shown, generates a serial signal (consisting of a start signal and a touch information signal) corresponding to the detected touch area. This tough signal generating circuit generates the touch information as a serial signal at each 40 msec.

Figure 4:
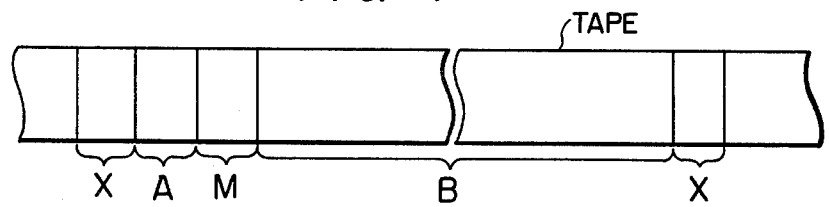
FIG. 4 is an explantory diagram useful for explaining the data region on a cassette tape.

FIG. 4 shows a data area section corresponding to one region on the cassette tape 3a, in which A is the header section on which is stored a map number, an absolute coordinats (relative to the North Pole) data at the upper right point on the map in that region, and the declination information of earth magnetism relative the dual north, B is a map data storing section on which the map data in that region is stored, and X is a blank section. Thus, by reading the sections A and B on the reader 3, the map data and absolute coordinates data in a specific ara can be applied to the microcomputer 4. For each of the other regions, the header section A and map data storing section B are similarly provided, and each header section A stores the declination information associated with that region.

Figure 6:
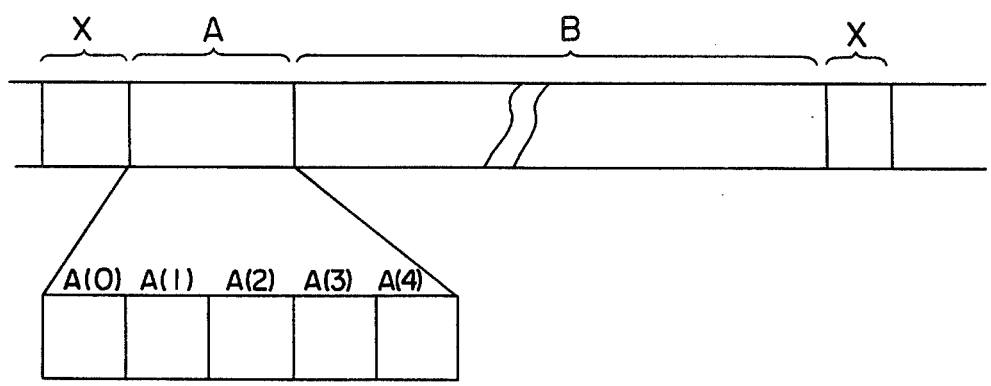
FIG. 6 is an explanatory diagram useful for explaining the division of region.
Figure 7:
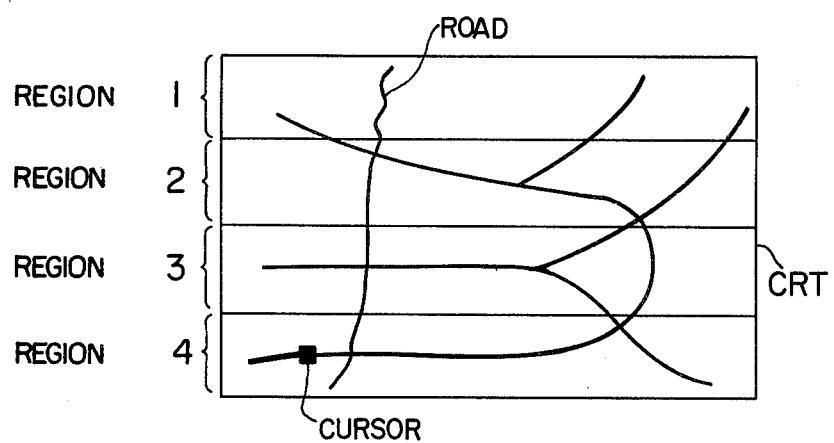
FIG. 7 is an explanatory diagram useful for explaining the displaying condition of a CRT display.

FIG. 6 further shows a data area section corresponding to the picture in a region on the cassette tape 3a. Where, A is the header section on which are stored a map number, an absolute coordinates (relative to the North Pole) data at the upper right point in that region, and inherent information in four areas which that region has, B is the map data storing section on which the map data in that region is stored, and X is the blank section. FIG. 7 shows the four areas 1 to 4 of the map data displayed on the screen, where the upper portion is the north. In the A(0) of the header section A is stored the map number and absolute coordinates data, and in the A(1) thereof are stored an earth magnetism strength data and a distortion factor correction data on the map picture of the area 1 as shown in FIG. 7. Similarly in the A(2), A(3) and A(4) are stored an earth magnetism strength data and a distortion factor correction data on the map picture, of the area 2, 3 and 4, respectively. Thus, by reading the sections A and B on the reader 3, the microcomputer 4 can be supplied with the map data and absolute coordinates data in a specific region, and the earth magnetism strength data and distortion factor correction data on the map picture in each area of the specific region. Also, in each of the other regions, are provided the header section A and map data storing section B. Each area of each header section A associated with that region stores an earth magnetism strength data and distortion factor correction data.

Figure 8:
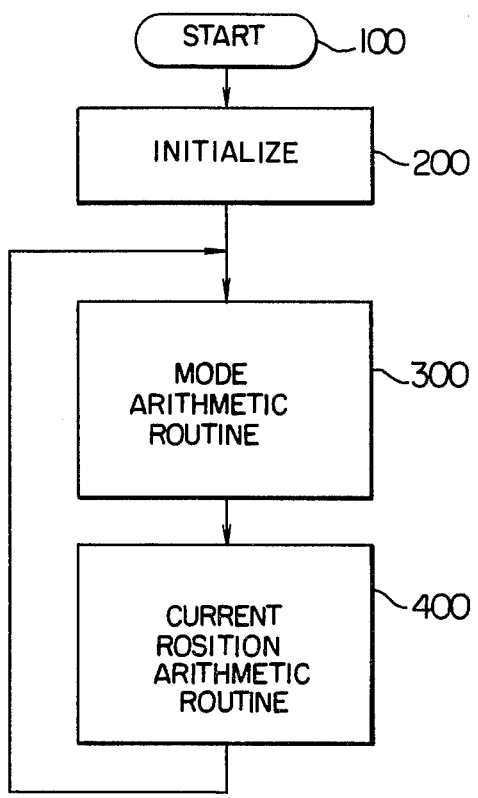
FIG. 8 is a flow chart of the main routine which a microcomputer executes.
Figure 10:
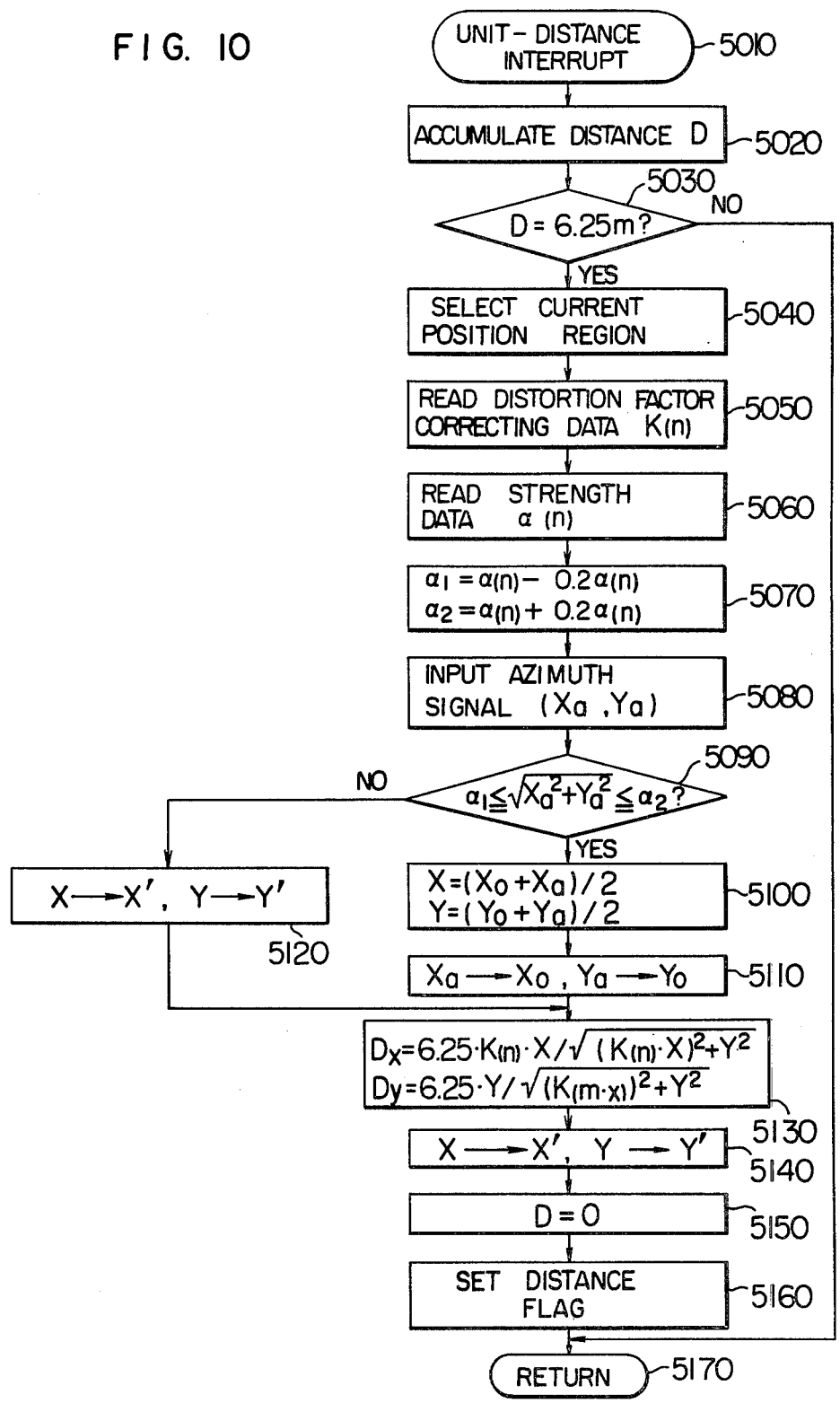
FIG. 10 is a flow chart of an interruption arithmetic routine to be executed on the basis of a distance pulse from the distance sensor.
Figure 11:
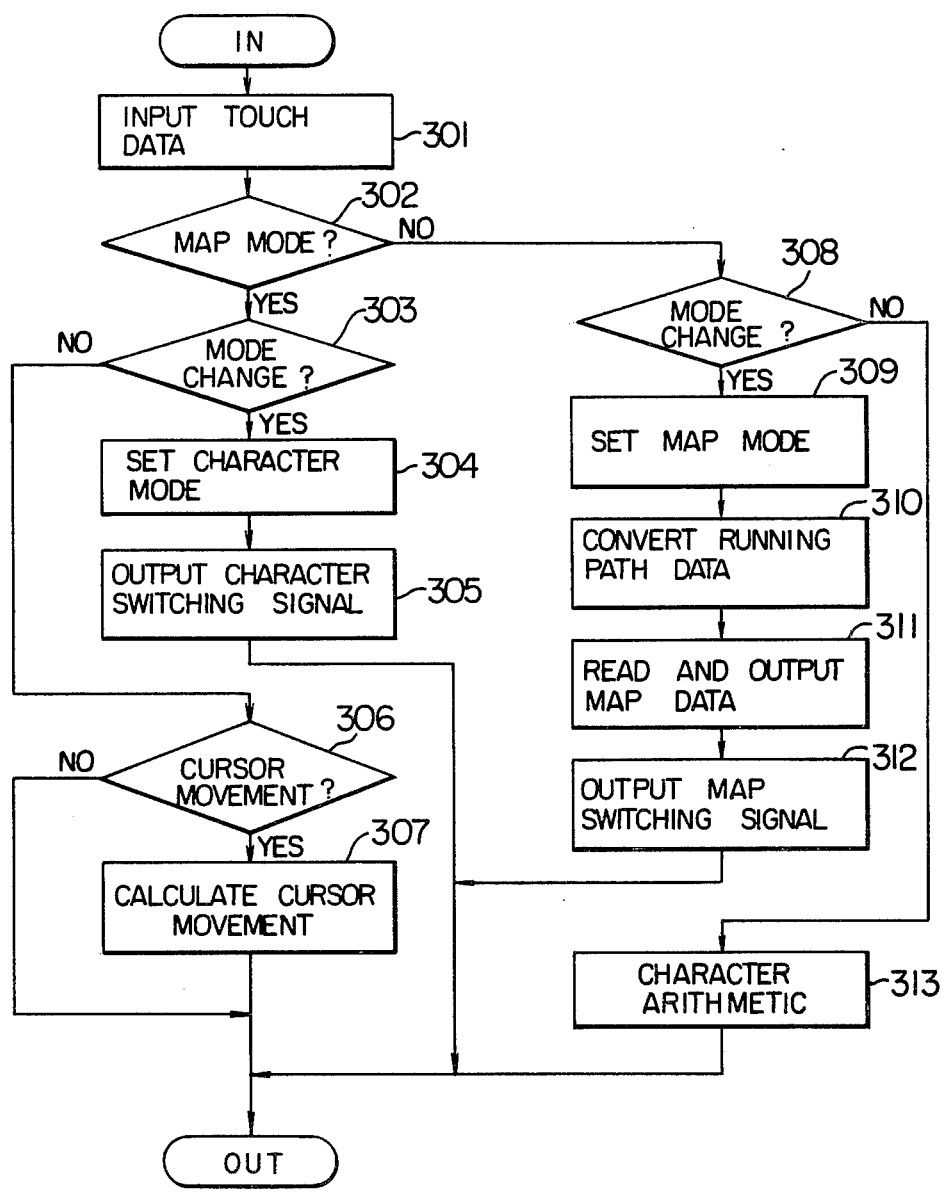
FIG. 11 is a detailed flow chart of a mode arithmetic routine in FIG. 8.
Figure 12:
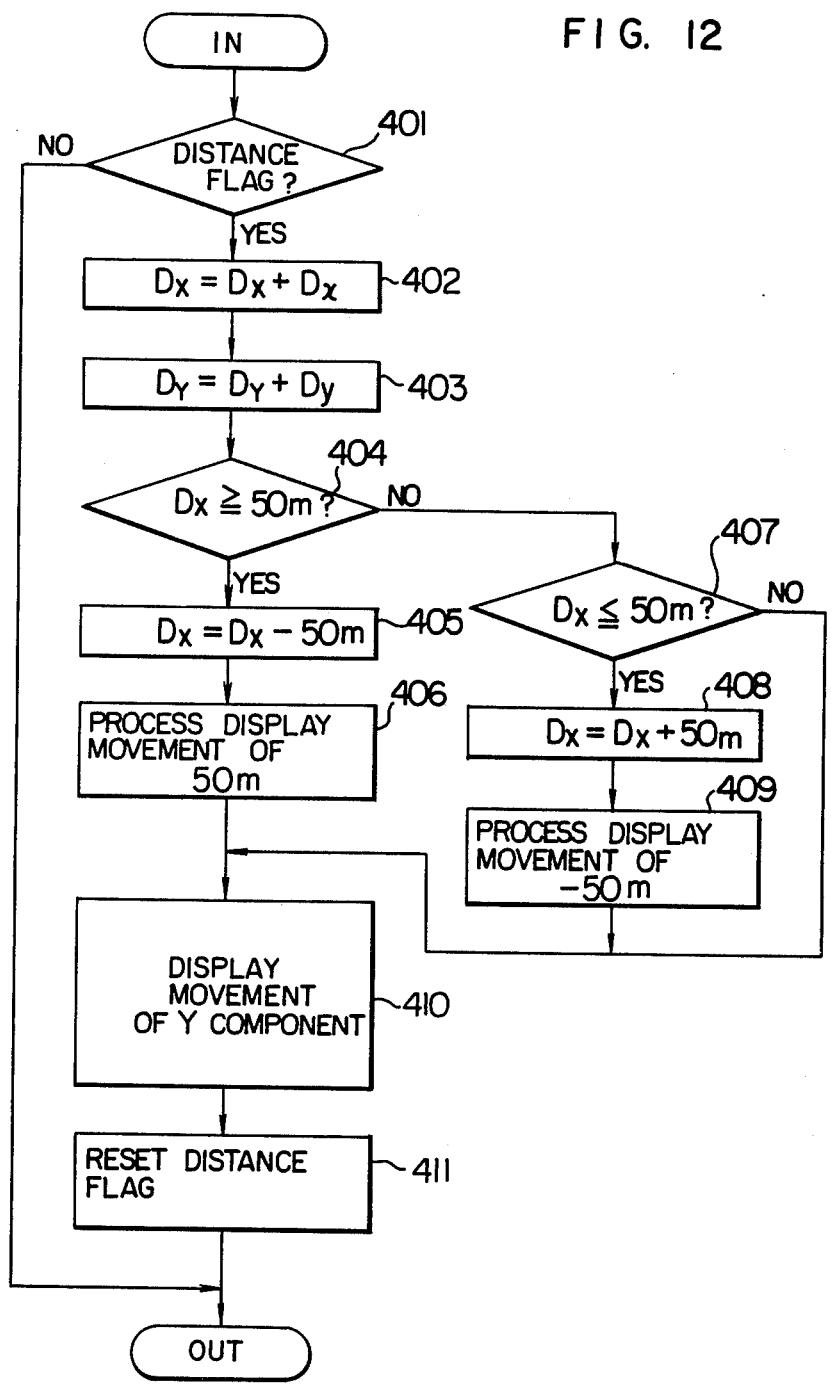
FIG. 12 is a detailed flow chart of a current position arithmetic routine in FIG. 8.

The operation of the arrangement will be described with reference to an explanatory diagram of FIG. 5 and flow charts of arithmetic operation of FIGS. 8 to 12. FIG. 8 is the flow chart of a main routine to be executed by the microcomputer 4, FIGS. 9 and 10 is the flow chart of an interruption arithmetic routine to be executed on the basis of the distance pulse from the distance sensor 2, FIG. 11 is the detailed flow chart of a mode arithmetic routine in FIG. 8, and FIG. 12 is the detailed flow chart of a current position arithmetic routine in FIG. 8.

If, now, a key switch is turned on upon start of the operation of the vehicle having the component elements 1 to 7 shown in FIG. 1, each electrical system is brought into operation by the mobile battery. Then, the microcomputer 4 is actuated by the 5-V stabilized voltage from the regulated power supply, to start the arithmetic processing at a start step 100. The program progresses to an initializing routine 200, where the registers, counters, latches and so on within the microcomputer 4 are set to the initial condition necessary for start of the arithmetic processing. After this initialization, the mode arithmetic routine 300 and the current position arithmetic routine 400 are repeatedly executed in turn with a period of about several tens of msec.

In this mode arithmetic routine 300, either of the map mode and character mode is selected, and the contents according to the selected mode are displayed on the CRT. When the map mode is selected, the cursor showing the current position can be moved, while in the mode of character the arithmetic processing is made which enables a map in a particular region to be specified. Then the program goes to the current position arithmetic routine 400, where the current position data and running track data in the second graphic memory 22 of the CRT controller 5 are changed at each time of ±50-m change of running for X and Y components. Then, the program goes back to the mode arithmetic routine 300. Thereafter, the arithmetic processing from the routine 300 to routine 400 is repeated with a period of about several tens of msec.

Figure 9:
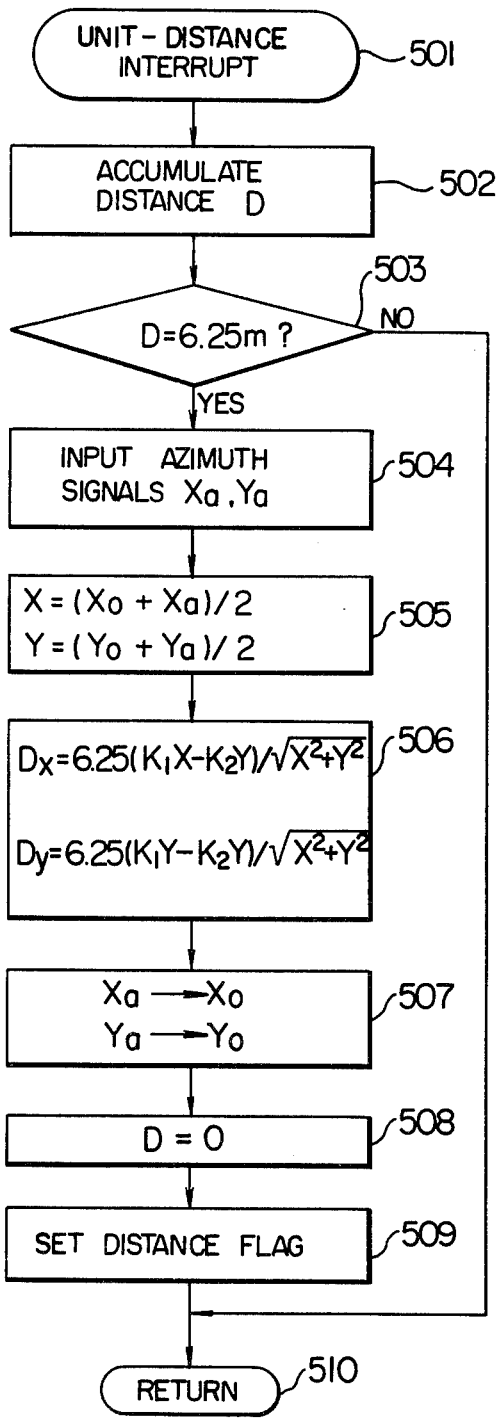
FIG. 9 is a flow chart of an interruption arithmetic routine to be executed on the basis of a distance pulse from a distance sensor.

During the repeated execution of these routines, when the distance pulse is supplied from the distance sensor 2 to the interruption (INT) terminal of the microcomputer 4, the microcomputer 4 interrupts the arithmetic processing of the main routine, and instead, executes the interruption arithmetic routine shown in FIG. 9. At an interruption start step 501, the arithmetic processing is started and then at an integration step 502, unit distance data (corresponding to about 39.2 cm) is added to distance data D stored in the RAM 4c to update the memory. At a distance decision step 503, where decision is made of whether the distance data D reaches 6.25 m. If the distance data D does not reach 6.25 m yet, decision is made to be NO and the routine goes to a return step 510. If the distance data D raches 6.25 m, decision is made to be YES, and the routine goes to an azimuth signal input step 504. At step 504, digital X and Y component signals Xa and Ya (east and north taken as positive direction, and west and south taken as negative direction) are supplied from the azimuth detector 1 to the microcomputer 4. At an average azimuth calculating step 505, average azimuth data X and Y are determined from the preceding azimuth data $X_o$, $Y_o$ (azimuth data before running of 6.25 m) and this azimuth data $X_a$, $Y_a$. Then, at a distance component calculating step 506, a distance component $D_x$ in the X-direction is determined from the expression of $$\frac{6.25 (K_1 X - K_2 Y)}{\sqrt{X^2 + Y^2}}$$

and a distance component $D_y$ in the Y-direction is determined from $$\frac{6.25 (K_1 Y + K_2 X)}{\sqrt{X^2 + Y^2}}$$

where $X/\sqrt{X^2+Y^2}$ is cos θ (θ is the counter-clockwise angle of detection azimuth) with respect to the eastward direction, $Y/\sqrt{X^2+Y^2}$ is sin θ, $K_1$ is cos α (α is polarization angle with respect to due north, positive when measured in the counter-clockwise direction), $K_2$ is sin α, and $K_1$ and $K_2$ are read from the header section on the cassette tape 3a as polarization angle information and stored in the RAM 4c, the contents of which are used as $K_1$ and $K_2$. At a storing step 507, this azimuth data $X_a$, $Y_a$ are stored for the next time, as $X_o$, $Y_o$. Then, at a distance data reset step 508, the distance data D is reset to 0, and at a distance flag set step 509 the distance flag is set. At a return step 510, this interruption arithmetic routine goes back to the previously interrupted main routine. That is, in this interruption arithmetic routine the distance data D is accumulated to update at each unit distance running, and when the distance data D reaches 6.25 m, the X and Y distance components $D_x$, $D_y$ for 6.25 m are calculated, and arithmetic processing is made to set the distance flag.

When the distance pulse is applied from the distance sensor 2 to the interruption (INT) terminal of the microcomputer 4 during repeated execution of the main routine, the microcomputer 4 interrupts the arithmetic processing of the main routine, and instead, executes the interruption arithmetic routine shown in FIG. 10. At an interruption start step 5010, the arithmetic processing is started, and then at an accumulation step 5020 a unit distance data (corresponding to about 39.2 cm) is accumulated to the distance data D stored in the RAM 4c to update. Thereafter, at a distance decision step 5030, decision is made of whether the distance data D reaches 6.25 m or not. If the distance data D does not reach 6.25 m yet, decision is made to be NO and the routine goes to a return step 5170. If the distance data D reaches 6.25 m, decision is made to be YES, and the routine progresses to a current position area selecting step 5040, where one of the areas 1 to 4 as shown in FIG. 7, in which this current position exists, is determined and selected from the Y-coordinate data of current position stored in RAM 4c. Then, at a distortion factor correcting data read step 5050, a distortion factor correction data (denoted by K(n)) of the previously selected area is read from the distortion correction data $K_1$ to $K_4$ (operation of reading from the cassette tape 3a and storing in the RAM 4c will be described later) associated with the area 1 to 4 stored in the RAM 4c and at a strength data rading step 5060, strength data (represented by α(n))in the previously selected area is read from the strength data $α_1$ to $α_4$ (operation of reading from the cassette tape 3a and storing in the RAM 4c will be described later) associated with the areas 1 to 4 stored in the RAM 4c. Therefater, at an upper and lower limit calculation step 5070, a strength lower limit data $α_1$ and a strength upper limit data $α_2$ are determined by the equations of $α_1 = α(n) - 0.2 α(n)$ $α_2 = α(n) + 0.2 α(n)$ and then at an azimuth signal input step 5080, the digital X and Y component signals $X_a$ and $Y_a$ (east and north assumed as positive direction and west and sourth as negative direction) are inputted from the azimuth detector 1. At the next strength decision step 5090, decision is made of whether the earth's magnetic field strength $\sqrt{X_a^2 + Y_a^2}$, to be determined by the previously inputted azimuth signals $X_a$ and $Y_a$, is within the range from the strength lower limit data $α_1$ to the strength upper limit data $α_2$. If it is within the range, decision is made to be YES and the routine goes to an average azimuth calculating step 5100, where the average azimuth data X and Y are determined by the previous azimuth data $X_o$ and $Y_o$ (azimuth data before running of 6.25 m) and this-time azimuth data $X_a$ and $Y_a$. At the next azimuth data storing step 5110, the azimuth data $X_a$ and $Y_a$ are stored as $X_o$ and $Y_o$ for the next time. If the strength $\sqrt{X_a^2 + Y_a^2}$ is not within the range from the lower limit data $α_1$ to the upper limit data $α_2$, decision is made to be NO, and the routine goes to a an average azimuth setting step 5120, where the old average azimuth data X' and Y' used so far are changed to the average azimuth data X and Y. After the steps 5110 and 5120, a distance component calculating step 5130 follows, where the X-distance component $D_x$ and Y-distance component $D_y$ are determined from the equations, $$\frac{6.25 \cdot K(n) \cdot X}{\sqrt{(K(n) \cdot X)^2 + Y^2}}, \frac{6.25 \cdot Y}{\sqrt{(K(n) \cdot X)^2 + Y^2}}$$

expressed in terms of average azimuth data X and Y and distortion factor correction data K(n), where $K(n) \cdot X/\sqrt{K(n) \cdot X)^2 + Y^2}$ corresponds to cos θ (θ: the counterclockwise angle with respect to the eastward direction), and $Y/\sqrt{(K(n) \cdot X)^2 + Y^2}$ corresponds to sin θ.

Then, at an average azimuth data storing step 5140, the average azimuth data X and Y are stored as old average azimuth data X' and Y'. At the next distance data reset step 5150, the distance data D is reset to 0. Thereafter, at a distance flag set step 5160, the distance flag is set and at the next return step 5170, this routine goes back to the previously interrupted main routine. That is, in this interruption arithmetic routine, the distance data D is accumulated to update at each unit distance running, and when the distance data D reaches 6.25 m, the X and Y distance components $D_x$ and $D_y$ at 6.25 m are calculated and the arithmetic processing for setting the distance flag is executed. While in this embodiment the map picture is divided into four sections, such division need not be made for practical use because the distortion factor is small around the equator, but in high latitudes the map picture need be divided into many sections.

The mode arithmetic routine 300 in the main routine will hereinafter be described in detail with reference to FIG. 11. In this routine 300, at a touch data input step 301, the arithmetic processing is started and the touch data from the touch panel section 7 is inputted into the RAM 4c. Then, at a map mode decision step 302, decision is made of whether the contents of the mode area in the RAM 4c is a map mode or not. If it is decided to be the map mode, or decision is made to be YES, the routine goes to a mode change decision step 303, where decision is made of whether the touch data stored in the RAM 4c is data showing mode change (the data obtained when the touch area 34 in FIG. 3 is pushed). If the touch data is dicided to be the data showing the mode change, or decision is made to be YES, the routine goes to a character mode setting step 304, where the contents of the aforesaid mode area is selected to be character mode. At the next character switching signal output step 305, a character switching signal for permitting a character picture to be presented on the CRT display 6 is generated from the video controller 26 in the CRT controller 5, thus finishing the first time arithmetic processing in this mode arithmetic routine 300.

On the other hand, at the step 303 if the touch data is not data of mode change, or if it is the data obtained when any one of the touch areas except the area 34 in FIG. 3 or no touch area is pushed (for example, data of FF), decision is made to be NO, and then the routine goes to a cursor movement decision step 306. At this decision step 306, decision is made of whether the aforesaid touch data is the data (data of cursor movement) obtained when any one of the touch areas of 32, 33, 35, 38, 40, and 41 is pushed. If the touch data is not the data of cursor movement, or decision is made to be NO, the first-time processing of the mode arithmetic routine 300 is finished. If the touch data is the data of cursor movement, decision is made to be YES, the routine goes to a cursor movement arithmetic step 307. At this step 307, when this touch data is the data obtained by pushing the touch area 32 or 33, the contents of the second graphic memory 22 in the CRT controller 5 are changed so that the cursor indicating the current position on the CRT display 6 is moved a predetermined distance in the north direction. Similarly, for the data obtained by pushing the touch area 35, 40 or 41, and 38 the contents of the second graphic memory 22 are changed so that the cursor is moved a predetermined distance in the west, south and east direction, respectively. Thus, the firsttime arithmetic processing of the mode arithmetic routine 300 is finished.

On the other hand, if decision at the map mode decision step 302 is NO, the routine 300 goes to a mode change decision step 308, where decision is made of whether mode change is needed or not by the same arithmetic processing as at the mode change decision step 303. At this step, if decision is YES, the routine goes to a map mode setting step 309, where the contents of the mode area in the RAM 4c are set to the map mode. At the next data converting step 310, the running path data in the second graphic memory 22 of the CRT controller 5 is converted. In this case, the reader 3 is controlled so that a specified region is searched by referring to its map number, and the coordinates conversion value is calculated from the absolute coordinate data in this searched map (stored on the header section A in FIG. 4) and that in the previous map. In accordance with this calculated value, conversion is made to slide data of the running track and current position within the second graphic memory 22. Moreover, the declination information ($K_1$, $K_2$ as described before) is read together the absolute coordinates data, and stored in the RAM 4c. Then, at a map data read output step 311, the map data on the cassette tape 3a is inputted via the reader 3, and the map data is read from the first graphic memory 21. At the next map switching signal output step 312, a map switching signal is generated from the video controller 26 in order to present a graphic picture of map on the CRT display 6, thus the first processing of the mode arithmetic routine 300 is finished. In other words, when switching is made from character picture to graphic picture of a different map from that at the previous time, the above mensioned arithmetic processing is executed, so that this-time map data is stored in the first graphic memory 21, and the contents of the second graphic memory 22 is converted to modify the running track and the cursor showing the current position to the current area associated with this map. Thus, even if switching is made from a map to another map to be displayed on the CRT display 6, the running track and current position can be displayed on a portion associated with that map.

On the other hand, if decision at the mode change decision step 308 is NO, the routine goes to a character arithmetic step 313. At this step 313, since character mode is set to and a character switching signal is applied to the video controller 26, the character picture as shown in FIG. 5 is displayed on the CRT display 6. The numbers 02-4-68 indicated at the center of this character picture represent specified district, area, and region, respectively. At this step 313, these numbers are incremented one by one by a increment switch 51, decremented similarly by a decrement switch 52, set by a set switch 53, and reset by a reset switch 54. These numbers, or data indicating the district, area, and region, or map number is stored in the RAM 4c. The switches 51, 52, 53 and 54 are associated with the touch areas 39, 40, 41, and 42 in FIG. 3.

Specifically, in the mode arithmetic routine 300 of FIG. 11, the following operations to (1) to (4) are executed in accordance with the touch data from the touch panel section 7 and the mode area in RAM 4c:

(1) If cursor move instruction is issued in the map mode, not in the mode change, arithmetic processing for cursor movement is performed, and if no cursor move instruction is issued, indication of the map is continued as it is.

(2) If mode change instruction is issued in the map mode, the map mode is changed to character mode, and character picture is presented on the CRT display 6.

Figure 5:
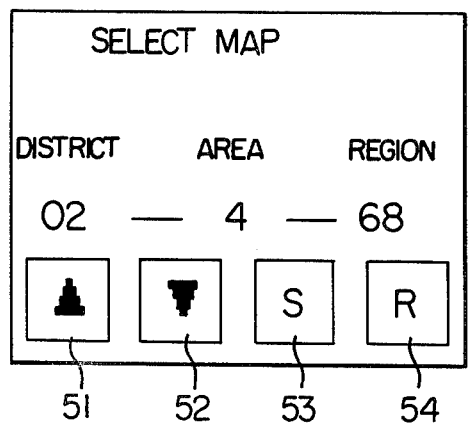
FIG. 5 is an explanatory diagram useful for explaining the data region on the cassette tape.

(3) In the character mode, and upon no mode change being demanded, the change of map can be accepted for the character picture as shown in FIG. 5.

(4) When mode change instruction is issued in the character mode, the mode is changed from the character mode to the map mode, and the graphic picture of a map is presented on the CRT display 6 together with modified running track and current position.

This current position arithmetic routine 400 in the main routine will hereinafter be described in detail. In this routine 400, at a distance flag decision step 401, the arithmetic processing is started and decision is made of whether the distance flag is set or not in the interruption arithmetic processing shown in FIG. 4. If the distance is not set, or decision is NO, the first-time arithmetic processing of this routine 400 is finished. If the distance flag is set, or decision is YES, the routine goes to an X-distance correction step 402. At this step 402, the X-distance data DX is calculated for correction ($DX = DX + D_x$) by the X-distance component $D_x$ determined in the interruption arithmetic processing. At the next Y-distance correction step 403, the Y-distance data DY is similarly calculated for correction ($DY = -DY + D_y$). Then, at a first X-distance decision step 404, decision is made of whether the X-distance data DX has reached 50 m or above. If the distance data DX is 50 m or above, or decision is YES, the routine goes to an X-distance subtraction step 405. At this step 405, the value of 50 m is subtracted from the X-distance data DX. At the next display movement step 406, the current position data in the second graphic memory 22 is moved by 50 m in the positive direction (east direction) and the running track data is allowed to follow it.

If decision at the first X-distance decision step 404 is NO, the routine goes to a second X-distance decision step 407, where decision is made of whether the X-distance data DX has reached −50 m or below. If the X-distance data DX is the value of −50 m or below, or decision is YES, the routine goes to an X-distance adding step 408. At this step 408, the value of 50 m is added to the X-distance data DX, and at the next display movement step 409, the current position data in the second graphic memory 22 is moved by 50 m in the negative direction (west direction) and the running track data is allowed to follow it.

If, at the second X-distance decision step 407, decision is NO, or if the step 406 or 409 is finished, the routine goes to a Y component display movement processing routine 410, where the same decisions and arithmetic processing as at steps 404 to 409 are made on the Y-distance data DY calculated at the Y-distance correction step 403. (When the Y-distance data DY becomes positive or negative 50 m or above, the current position data and running track data are moved 50 m in the corresponding direction.) Then, at the next distance flag reset step 411, the distance flag is reset.

In other words, in the current position arithmetic routine 400 of FIG. 12, the current position data and running track data in the second graphic memory 22 are converted irrespective of the picture displayed on the CRT display 6.

Therefore, the main routine of the mode arithmetic routine 300 and current position arithmetic routine 400 is repeatedly executed and the interruption arithmetic routine of FIG. 9 is executed, so as to successively alter the current position data and running track data in the second graphic memory 22, and present a picture in a specific mode on the CRT display 6, such that in the map mode, a graphic picture (including the present position and running track) of a map is displayed, and in the character mode, a character picture for specifying a map as shown in FIG. 5 is displayed.

While in the above embodiment declination information is added upon calculation of the X and Y distance components $D_x$ and $D_y$ for running of 6.25 m, the angle determined as a signal from the azimuth detector 1 may be corrected by the declination.

While the CRT display 6 is shown as display means, a liquid display, EL display or the like may be employed as display means.

In addition, while the cassette tape 3a is shown as memory means, a single-chip ROM may be used interchangeably.

We claim:

1. A mobile navigator comprising:
   distance detecting means for detecting the distance a vehicle has run;
   azimuth detecting means for detecting the azimuth in which said vehicle progresses;
   display means;
   storage means for storing a plurality of map data to be displayed as road maps for specific areas on said display means and different kinds of earth's magnetic field information associated with said pluality of map data of different areas; and
   control means for reading a particular map data from said storage means so that a road map of a particular area is displayed on said display means, reading certain earth's magnetic field information associated with said particular map data from said storage means, and calculating a current position of said running vehicle on the basis of said read earth's magnetic field information, said azimuth detected by said azimuth detecting means and said distance detected by said distance detecting means, thereby to allow said calculated current position to be displayed on the screen of said display means on which a road map is already displayed.

2. A mobile navigator according to claim 1, wherein said storage means stores distance distortion information different for each area in association with the plurality of map data, and said control means reads the distance distortion associated with the map data of a particular area from said storage means, thus the current position of the running vehicle being calculated from said distance distortion information, said progression azimuth data and said running distance data.

3. A mobile navigator according to claim 1, wherein said storage means stores earth's magnetic field declination information different for each area in association with the plurality of map data, and said control means reads the declination information associated with the map data of a particular area from said storage means, thus the current position of the running vehicle being calculated from said declination information, said progression azimuth data and said running distance data.

\* \* \* \* \*